(12) United States Patent
Ingrassia, Jr. et al.

(10) Patent No.: US 8,793,520 B2
(45) Date of Patent: Jul. 29, 2014

(54) POWER MANAGEMENT OF ELECTRONIC DEVICES BASED ON CHARGING LOCATION

(75) Inventors: Michael I. Ingrassia, Jr., San Jose, CA (US); Jeffery T. Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 253 days.

(21) Appl. No.: 13/358,194

(22) Filed: Jan. 25, 2012

(65) Prior Publication Data

US 2013/0191662 A1   Jul. 25, 2013

(51) Int. Cl.
*G06F 1/32* (2006.01)

(52) U.S. Cl.
USPC .......................... 713/320; 455/573; 455/574

(58) Field of Classification Search
USPC .................................. 455/574, 573; 713/320
See application file for complete search history.

(56) References Cited

U.S. PATENT DOCUMENTS

| | | | |
|---|---|---|---|
| 6,611,921 | B2 | 8/2003 | Casebolt et al. |
| 7,062,547 | B2 | 6/2006 | Brown et al. |
| 7,161,578 | B1 | 1/2007 | Schneider |
| 7,425,945 | B2 | 9/2008 | Arrigo et al. |
| 7,479,944 | B2 | 1/2009 | Casebolt et al. |
| 7,696,980 | B1 | 4/2010 | Piot et al. |
| 7,787,405 | B2 | 8/2010 | Dettinger et al. |
| 8,588,870 | B1 * | 11/2013 | Vargantwar .................... 455/574 |
| 2006/0047783 | A1 | 3/2006 | Tu |
| 2007/0111796 | A1 | 5/2007 | Giaimo et al. |
| 2007/0155441 | A1 | 7/2007 | Carbonaro |
| 2008/0168267 | A1 | 7/2008 | Bolen |
| 2008/0268874 | A1 | 10/2008 | Pizzi |
| 2009/0013204 | A1 | 1/2009 | Kobayashi et al. |
| 2010/0001870 | A1 | 1/2010 | Hong et al. |
| 2010/0039381 | A1 | 2/2010 | Cretella, Jr. et al. |
| 2011/0111799 | A1 | 5/2011 | Kothari et al. |
| 2011/0187931 | A1 | 8/2011 | Kim |
| 2011/0207509 | A1 | 8/2011 | Crawford |
| 2013/0162430 | A1 * | 6/2013 | Scherzer et al. .......... 340/539.13 |
| 2013/0175974 | A1 * | 7/2013 | Bassham et al. .............. 320/106 |

FOREIGN PATENT DOCUMENTS

JP         10-096749        4/1998

OTHER PUBLICATIONS

PCT/US2013/022763. International Search Report & Written Opinion. Jun. 12, 2013.

* cited by examiner

*Primary Examiner* — Albert Wang
(74) *Attorney, Agent, or Firm* — Womble Carlyle Sandridge & Rice LLP

(57) ABSTRACT

A method for modifying one or more characteristics of a mobile electronic device in order to save or reduce power consumption of the device. The method includes determining by, a processor of the mobile electronic device, an estimated use of the mobile electronic device during an upcoming time period; using the estimated use, determining, by the processor, whether an internal power source of the mobile electronic device has sufficient power to continue operation of the mobile electronic device in a first state during the upcoming time period; based on the estimated use and the internal power source, if the internal power source does not have sufficient power, adjusting the one or more characteristics to reduce a power consumption of the mobile electronic device during the upcoming time period.

20 Claims, 7 Drawing Sheets

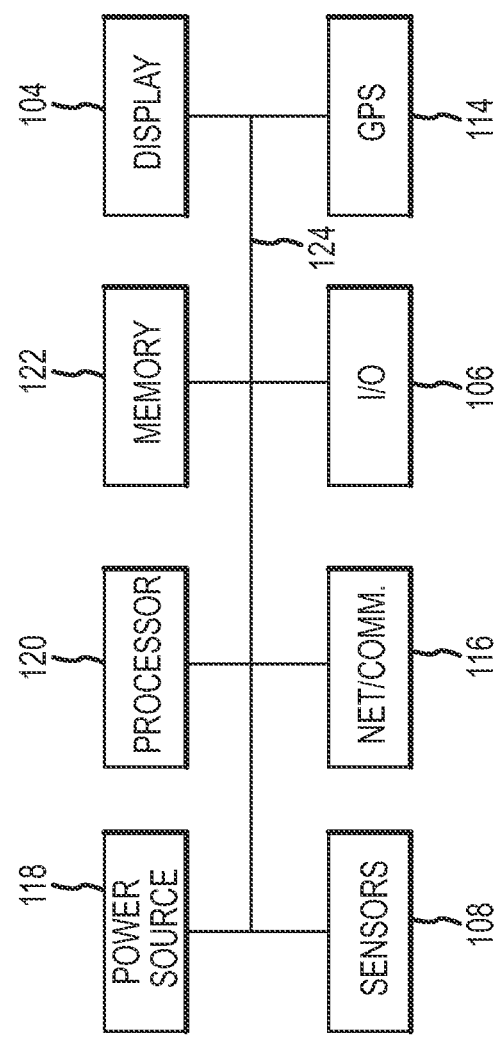

POWER MANAGEMENT OF ELECTRONIC DEVICES BASED ON CHARGING LOCATION

TECHNICAL FIELD

The present invention relates generally to electronic devices and, more specifically, to power management for electronic devices.

BACKGROUND

Many mobile electronic devices include a portable power source, such as a rechargeable battery, in order to provide power to the devices. Based on the time between recharging, the number of applications running, types of applications running, and so on, the power consumption of the device may not be sufficient to provide power to the device between recharging. For example, a user may charge his or her device prior to leaving for work, and while at work may use a global positioning system (GPS) for turn-by-turn directions to attend a business meeting, watch one or more videos on the device, and make multiple phone calls, all without charging the device for a number of hours. In this case, the power source may be drained before the user has the chance to recharge the device and thus cease operating. However, in some instances the user may need the device to last longer between charges, especially in instances where the user may be on abnormal schedule, traveling, or the like.

SUMMARY

Examples of embodiments described herein may take the form of a method for modifying one or more characteristics of a mobile electronic device in order to save or reduce power consumption of the device. The method includes determining, by a processor of the mobile electronic device, an estimated use of the mobile electronic device during an upcoming time period; using the estimated use, determining, by the processor, whether an internal power source of the mobile electronic device has sufficient power to continue operation of the mobile electronic device in a first state during the upcoming time period; based on the estimated use and the internal power source, if the internal power source does not have sufficient power, adjusting the one or more characteristics to reduce a power consumption of the mobile electronic device during the upcoming time period.

Other embodiments may take the form of a mobile electronic device. The mobile electronic device may include an internal power supply configured to supply power to one or more components of the mobile electronic device, a processor in communication with the internal power supply, and a location mechanism in communication with the processor. The processor may be configured to determine an estimated use of the mobile electronic device during a time period, analyze a charge of the internal power supply to determine if the internal power source has sufficient power to provide power through the time period, and adjust a power management scheme if the internal power supply does not have sufficient power. The location mechanism is configured to determine a location of the mobile electronic device.

Still other embodiments may include a method for implementing a power management scheme of an electronic device. The method includes charging an internal power source power from an external power source, determining by a processor if a location of the external power source is known; and if the location is not known, modifying by the processor a power transfer rate between the internal power source and the external power source.

BRIEF DESCRIPTION OF THE DRAWINGS

FIG. 1B is a block diagram of the mobile electronic device of FIG. 1A.

DETAILED DESCRIPTION

Figure 1A:
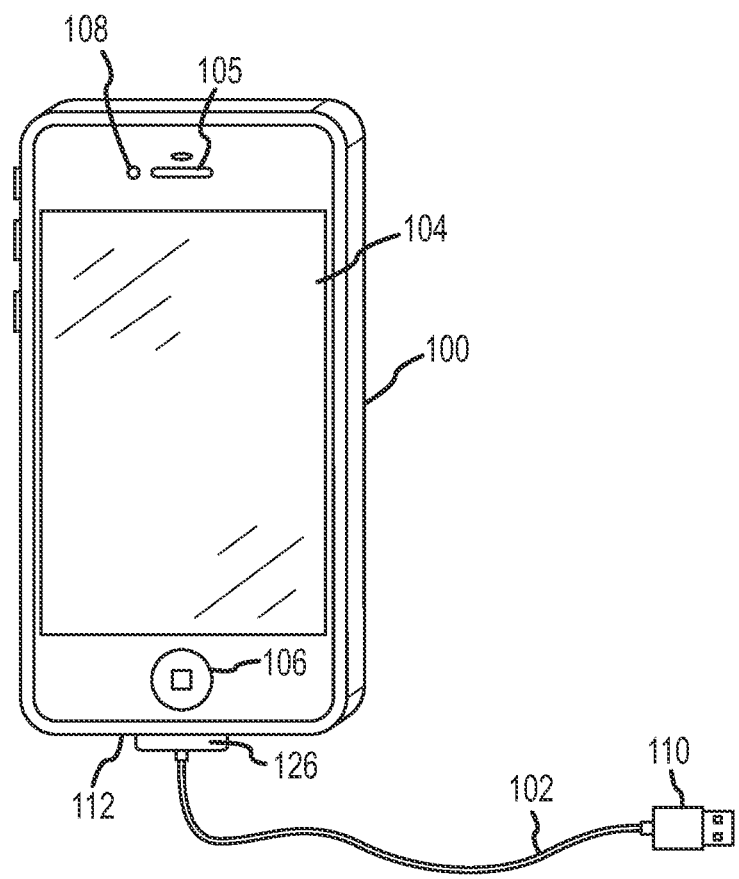
FIG. 1A is a perspective view of a mobile electronic device communicatively coupled to a charge cable.

Some embodiments described herein may take the form of a method for varying a power management scheme for a mobile electronic device. The method may include determining typical charging locations, charging patterns, and/or time between charging locations for the mobile electronic device. Based on typical usage and current or predicted use, the method may modify one or more characteristics, settings, parameters, applications, or components in order to adjust a power management scheme. The power management scheme may be adjusted so that the power source may provide power to the mobile electronic device for substantially the entire predicted use time.

In one embodiment, the mobile electronic device may store typical charging locations (e.g., locations where the mobile electronic device may be communicatively coupled to an external power source and that are commonly visited) and data about each of those locations. The user may directly input the charging location information, the mobile device may sample data over time to create a database or storage of information, or the mobile electronic device may have a "test" time such as a number of days or a week during which the mobile electronic device may store data corresponding to the "typical" usage data. The charging location data may include any or all of the physical location, the type of external power source connection (e.g., wall outlet, device to device, mobile), typical charge time, and/or typical travel time to from and/or to other typical charging locations.

Once the mobile electronic device has stored one or more typical charging locations and/or typical usage patterns, the device may modify the power management scheme or profile based on the current use or predicted use. For example, using a GPS sensor the mobile electronic device may determine, based on its current location, that it may be at least eight hours before the mobile electronic device will be recharged or otherwise connected to an external power source. In this case, the mobile electronic device may modify the power management scheme by adjusting one or more characteristics or settings. In some examples, the mobile electronic device may reduce a data fetching rate (e.g., for email or other data), decrease a display brightness, turn off select applications or prevent those applications from running, and so on.

The scheme may be adjusted dynamically or a static scheme may be implemented. For example, the power management scheme may be updated as the device moves closer or farther away from a charging location, in response to a user override, or as power consumption varies. Alternatively, in some embodiments the power management scheme may be set until the mobile electronic device recharges.

Additionally, it should be noted that in some embodiments, the mobile electronic device may receive certain inputs from the user regarding the desired power management scheme. For example, the user may specify how long he or she needs the mobile electronic device to have power, priority of applications or characteristics, particular power schemes, or the like. In this manner, the power management scheme may be customized based on the use of the particular device and, optionally, user preferences.

In addition to adjusting applications, characteristics, and/or settings based on an estimated or projected use, the device may use a power management scheme to adjust a charging rate. For example, if the mobile electronic device is communicatively coupled to an external power source in an unknown location, the mobile electronic device may charge at a maximum rate. This may permit the mobile electronic device to charge quickly when connected to unknown external power sources. For example, when a user is traveling with his or her device, he or she may plug the mobile electronic device into temporary charging sources and may only have a few minutes to receive a charge before he or she has to change locations. As a specific example, many users may need a quick power charge for the mobile electronic device before boarding an airplane, beginning a road trip, or other travel.

Turning now to the figures, the mobile electronic device will be discussed in more detail. FIG. 1A is a perspective view of a mobile electronic device 100 operably connected to a power cable 102. FIG. 1B is an illustrative block diagram of the mobile electronic device 100. With reference to FIGS. 1A and 1B, the mobile electronic device 100 may be substantially any type of electronic or computing device, such as but not limited to, a smart phone, laptop, gaming device, digital music player, personal digital assistant, and so on. In some embodiments, the mobile electronic device 100 may include a display 104, an input member 106, an output member 105, one or more sensors 108, a global positioning system (GPS) mechanism 114 or receiver, a network/communication interface 116, an internal power source 118, a processor 120, and/or memory 122.

The display 104 may provide an image or video output for the mobile electronic device 100. The display 104 may be substantially any size and may be positioned substantially anywhere on the electronic device 104. In some embodiments, the display 104 may be a liquid display screen, plasma screen, light emitting diode screen, and so on. The display 104 may further include one or more input sensors, e.g., capacitive touch screen, or infrared touch screen. In these embodiments, the display 104 may also provide input as well as output functions.

The input member 106 (which may be a switch, button, capacitive sensor, or other input mechanism) allows a user to interact with the mobile electronic device 100. For example, the input member 106 may be a button or switch to alter the volume, return to a home screen, and the like. Additionally, the input member 106 may also provide haptic feedback or other haptic output for the mobile electronic device 100. The output member 105 may be combined with the input member 106 or may be separate therefrom. The output member 105 may provide output to the user from the mobile electronic device 100. The mobile electronic device 100 may include one or more input members 106 and/or output members 105, and each member 105, 106 may have a single input or output function or multiple input/output functions. Furthermore, in some embodiments, the input member 106 may be incorporated into the display 104, for example as a capacitive input for a capacitive touch screen.

The input port 112 may be formed within or defined by an enclosure of the mobile electronic device 100 and may electrically connect an external device (e.g., headphones, speakers) or power source to one or more internal components of the mobile computing device 100. The input port 112 is configured to receive an electrical connector for the mobile electronic device 100. For example, the input port 112 may be configured to receive the power cable 102, a data cable (e.g., universal serial bus, fiber optic, tip ring sleeve connector, and the like), or a combination data and power cable. The mobile electronic device 100 may include more than one input port 112 and each input port 112 may be positioned substantially anywhere on the electronic device 100.

The mobile electronic device 100 may also include one or more sensors 108 positioned substantially anywhere on the mobile electronic device 100. The sensor 108 may include a single sensor or multiple sensors. Additionally, the sensor 108 may be configured to sense substantially any type of characteristic, such as but not limited to, images, pressure, light, touch, heat, movement, relative motion, and so on. For example, the sensor 108 may be an image sensor, a heat sensor, a light or optical sensor, an accelerometer, a pressure transducer, a gyroscope, a magnet, and so on.

The network/communication interface 116 may be used to place phone calls from mobile electronic device 100 (in embodiments where the mobile electronic device 100 is a phone), may be used to receive data from a network, or may be used to send and transmit electronic signals via a wireless or wired connection (Internet, WiFi, Bluetooth, and Ethernet being a few examples). In some embodiments, the network/communication interface 116 may support multiple network or communication mechanisms. For example, the network/communication interface 116 may pair with another device over a Bluetooth network to transfer signals to the other device, while simultaneously receiving data from a WiFi or other network.

The GPS mechanism 114 may be substantially any mechanism, receiver, circuit, or sensor that may determine an approximate or exact location of the mobile electronic device 100. For example, the GPS mechanism 114 may, in communication with the network/communication interface 116, use network data (such as WiFi, cellular signals) to determine a location of the mobile electronic device 114. In other embodiments, the GPS mechanism 114 may be a GPS receiver that interacts with GPS satellites to determine the coordinates and location of the mobile electronic device 100. In some embodiments, the GPS mechanism 114 may be an assisted global positioning system (AGPS) and may use network signals or data in combination with one or more GPS satellites to determine a location of the mobile electronic device.

The internal power source 118 may be substantially any type of member that may provide power to one or more components of the mobile electronic device 100. However, in some embodiments, the power source 118 may be a rechargeable portable power source, such as one or more batteries. The power source 118 may be recharged or otherwise receive additional power from the power cable 102 when the power cable 102 is communicatively coupled to an external power source, such as a wall outlet, mobile charger, or the like. For example, in some embodiments, the power source 118 may be a rechargeable lithium ion battery. However, it should be noted that other types of power sources are envisioned as well.

The processor 120 may control operation of the mobile electronic device 100. The processor 120 may be in communication, either directly or indirectly, with substantially all of the components of the mobile electronic device 100. For example, one or more system buses 124 or other communication mechanisms may provide communication between the processor 120, the display 104, the output member 105, the input member 106, the sensors 108, and so on. The processor 120 may be any electronic device cable of processing, receiving, and/or transmitting instructions. For example, the processor 120 may be a microprocessor or a microcomputer.

The memory 122 may store electronic data that may be utilized by the mobile electronic device 100. For example, the memory 122 may store electrical data or content e.g., audio files, video files, document files, and so on, corresponding to various applications. The memory 122 may be, for example, non-volatile storage, a magnetic storage medium, optical storage medium, magneto-optical storage medium, read only memory, random access memory, erasable programmable memory, or flash memory.

It should be noted that FIGS. 1A and 1B are illustrative only. In other examples, the electronic device may include fewer or more components than those shown in FIGS. 1A and 1B.

Referring again to FIG. 1A, the power cable 102 may transfer power and/or data to the internal power source 118 from a power source, such as a battery, wall outlet, mobile charger (e.g., automobile charger), device charger (e.g., universal serial bus charger), and so on. The power cable 102 may be received into the input port 112 or may otherwise be in communication with the mobile electronic device 100.

Figure 2:
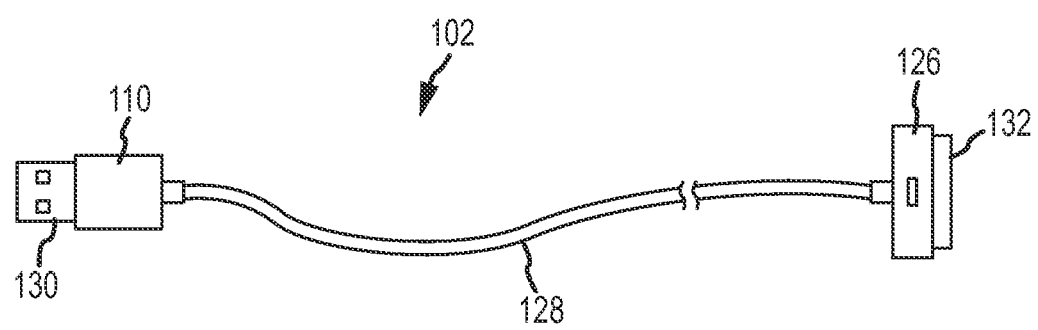
FIG. 2 is a perspective view of the charge cable removed from the mobile electronic device.

FIG. 2 is a perspective view of the power cable 102 removed from the mobile electronic device 100. The power cable 102 may include two plugs 110, 126, one of which is located on each end of a cable 128. Each of the plugs 110, 126 may include one more pins 130, 132 or connectors that may communicate with one or more corresponding pins (not shown) within the input port 112. In some embodiments, a first plug 110 may be a different type of plug than the second plug 126. For example, the first plug 110 may be a USB plug whereas the second plug 126 may be a 30-pin connector plug. In other embodiments, the plugs 110, 126 may be substantially any type of plug or connector and may vary depending on the desired external power source and/or the configuration of the input port 112.

The first plug 110 may connect to one or more external power sources, such as, but not limited to, a wall outlet, a mobile charging outlet (e.g., 12V vehicle outlet), input or power port on a computer (e.g., USB port), and so on. As such, the first plug 110 may be modified depending on the desired charging source and/or may include one more adapters in order to best communicate with the desired power source.

The second plug 126 may be configured to connect the cable 128 to the mobile electronic device 102. As such, the second plug 126 may be configured to communicate with the input port 112 and may be modified as the input port 112 may be modified.

In other embodiments, the mobile electronic device 100 may communicatively couple with one or more external power sources without the need for the power cable 102. For example, the mobile electronic device 100 may receive power from an external power source inductively or wirelessly, or may include an integrated plug in lieu of the power cable. In these embodiments, the power cable 102 may be omitted.

Figure 3:
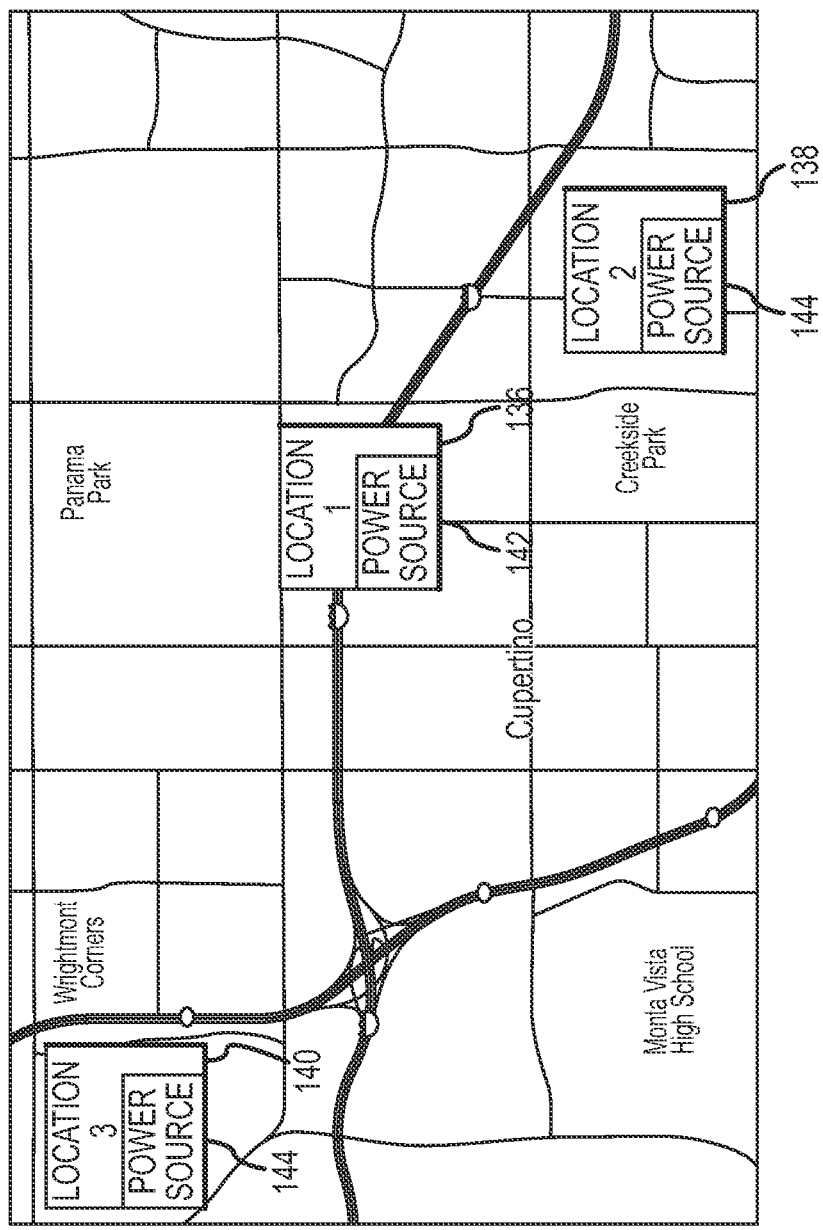
FIG. 3 is a block diagram a plurality of charging locations each including an external power source.

The power cable 102 may transfer power and/or data to the mobile electronic device 100 from substantially any desired type of power source or other device. Furthermore, the power cable 102 may be substantially portable, so that the mobile electronic device 100 may receive power in multiple locations. FIG. 3 is a block diagram illustrating various locations including different power sources which may be connected to power cable 102. A first location 136 may include a first external power source 142, a second location 138 may include a second external power source 144, and a third location 140 may include a third external power source 144. In FIG. 3 only three locations and three external power sources are illustrated; however, it other embodiments fewer or more locations and/or external power sources are envisioned. This may be especially true in instances where a user may travel and/or carry the mobile electronic device 100 frequently.

The locations 136, 138, 140 may be physically separate from one another by some arbitrary distance. Examples of suitable locations include a user's home, office, car, parent's house, and the like. Furthermore, each of the locations 136, 138, 140 may be stationary, temporary, or mobile. In other words, if a specific location 136, 138, 140 is permanent it may be a physical location, such as a building. If the location 136, 138, 140 is temporary it may be an atypical or rarely-visited location (e.g., an airport or bus station), and if the location 136, 138, 140 is mobile it may be part of a vehicle or otherwise accessible while the device is in motion. Examples of mobile locations include a car or other vehicle that may provide power to the device, as well as a charging network of inductive power relays that can provide power as a device moves within the network.

In some embodiments, the locations 136, 138, 140 may be in generally the same physical area but separated by a minimal amount of distance. For example, the first location 136 may be in a user's kitchen and the second location 138 may be in the user's office or bedroom. Also, it should be noted that the locations 136, 138, 140 illustrated may be learned, stored, or otherwise known to the mobile electronic device 100 or they may be new locations that may unknown to the mobile electronic device 100. For unknown or new locations, data about these locations may be stored for future reference, and any data collected while the device is in the new location may be used to implement one or more of the power schemes. For example, when the mobile electronic device 100 is located in the first location 136, the GPS mechanism 114 may determine the physical location and the processor 120 may correlate the position with a previously stored location or if the location is a new location may store data about the new location.

Each of the external power sources 142, 144, 146 may be the same or different from one another. For example, the first external power source 142 may be a wall outlet, the second external power source 144 may be a vehicle outlet, and the third external power source 144 may be a USB port of a computer. In another example, the first external power source 142 and the second external power source 144 may both be wall outlets and the third eternal power source may be a vehicle power source. It should be noted that the external power sources 142, 144, 146 may be substantially any device or mechanism that provide power or otherwise communicate with the mobile electronic device 100 (either directly or through the power cable 102). As such, the description of the external power sources 142, 144, 146 is meant as illustrative only.

Figure 4:
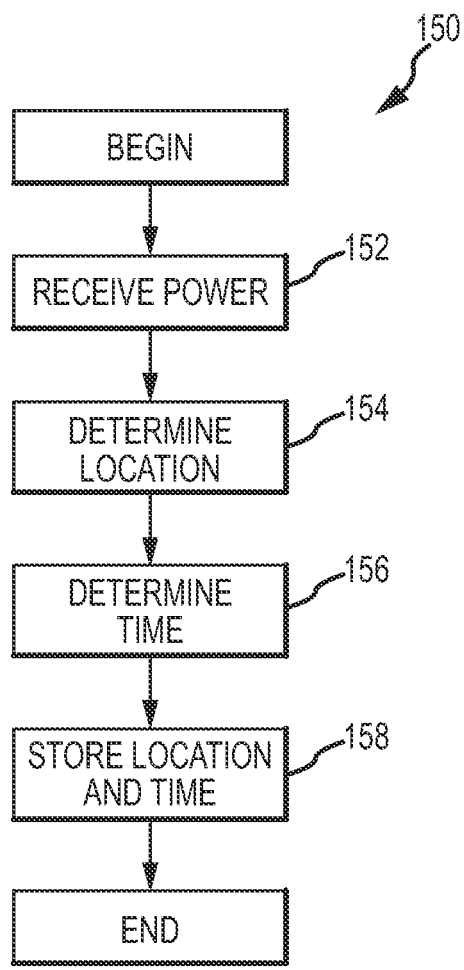
FIG. 4 is a flow chart illustrating a method for determining and/or storing or more charging locations for the mobile electronic device.

A method for determining and/or storing the locations 136, 138, 140 will now be discussed in more detail. FIG. 4 is a flow chart illustrating a method for determining and storing one or more of the locations 136, 138, 140. The method 150 may begin with operation 152, in which the mobile electronic device 100 may receive power from one of the external power sources 142, 144, 146. For example, the power cable 102 may facilitate communication between one of the external power sources 142, 144, 146 and the mobile electronic device 100. Specifically, the power cable 102 may connect the external power source to the internal power source 118. The power cable 102 may then transfer electrons from the external power source 142, 144, 146 to the internal power source 118. However, as noted above, in some instances the power cable 102 may be omitted and the internal power source 118 may receive power and/or data from the external power source 142, 144, 146 inductively or otherwise.

As the mobile electronic device 100 is receiving power and/or data, the method 150 may proceed to operation 154. In operation 154 the mobile electronic device 100 may determine the location of the external power source 142, 144, 146. In other words, the mobile electronic device 100 may determine where it is physically located while connected to the external power source 142, 144, 146. This is because, typically, the mobile electronic device 100 may be physically close to the external power source 142, 144, 146 while receiving power and/or data therefrom.

In operation 154, the mobile electronic device 100 may use the GPS mechanism 114, the sensors 108, and/or the network/communication interface 116 to determine its location. As one example, the mobile electronic device 100 may use one or more cellular or data networks (such as a GMS, CDMA and/or WiFi network) and/or the GPS mechanism 114 to determine an approximate position. In another example, the mobile electronic device 100 may employ a network identification, such as a Bluetooth or WiFi network name in order to determine a location. In this example, the mobile electronic device 100 may recognize a particular network signal as correlating to one of the locations 136, 138, 140.

In some embodiments, the mobile electronic device 100 may use a combination of a physical location and/or other external power source 142, 144, 146 identifier (such as a network pairing or connection). For example, a Bluetooth network may be associated with a particular location (e.g., Home Bluetooth network), and so when the mobile device 100 is connected to that network, the previously stored location for that network may be used to identify the physical location of the mobile electronic device 100. In these embodiments, the "location" of the external power source 142, 144, 146 may be not only a physical location but may include a name or description. This is because, for some external power sources such as a vehicle outlet, the physical location may vary as the vehicle moves, but the name/description or other identifiers may remain the same.

The position determined by the mobile electronic device 100 may be determined in latitude and longitudinal coordinates and then may be correlated to a map or database. The correlation may provide a name for the location, e.g., a business name, a street address, or the like. In other embodiments, the location may simply be an identifier the external power source 142, 144, 146, (e.g., "Brad's car").

After or during operation 154, the method 150 may proceed to operation 156 and the mobile electronic device 100 may determine the time. In some embodiments, operations 154 and 156 may be reversed or performed substantially simultaneously. The time may correspond to the time of the day, date, and/or a length of time that the mobile electronic device 100 is in communication with the specific external power source 142, 144, 146. In some embodiments, the time may correspond to a combination of the above-listed options. For example, the time data may be "10:00 AM on Monday July 24th for 45 minutes." In this example, a portion of the time may be unknown until the mobile electronic device 100 has been removed from the external power source 142, 144, 144. Specifically, the length of the charge time or the time that the mobile electronic device 100 is connected to the external power source 142, 144, 146 may be updated or created after the mobile electronic device 100 is removed from the power source 142, 144, 144.

Once the location and the time has been determined, the method 150 may proceed to operation 158 and the location and/or time may be stored in the memory 122. It should be noted that the location may be stored as map coordinates, optionally with a particular name (e.g., Office, House, etc.). In some embodiments, the mobile electronic device 100 may store the locations and/or times so that the processor 120 may determine "typical" charging locations and/or times. For example, the mobile electronic device 100 may be able to create a general schedule of charging times and/or locations during a user's typical use of the mobile electronic device 100.

After the mobile electronic device 100 has stored one more of the locations 136, 138, 140, the mobile electronic device 100 may use the known or stored locations 136, 138, 140 in order to adjust a power management scheme and/or one or more settings or characteristics for the mobile electronic device 100.

Figure 5:
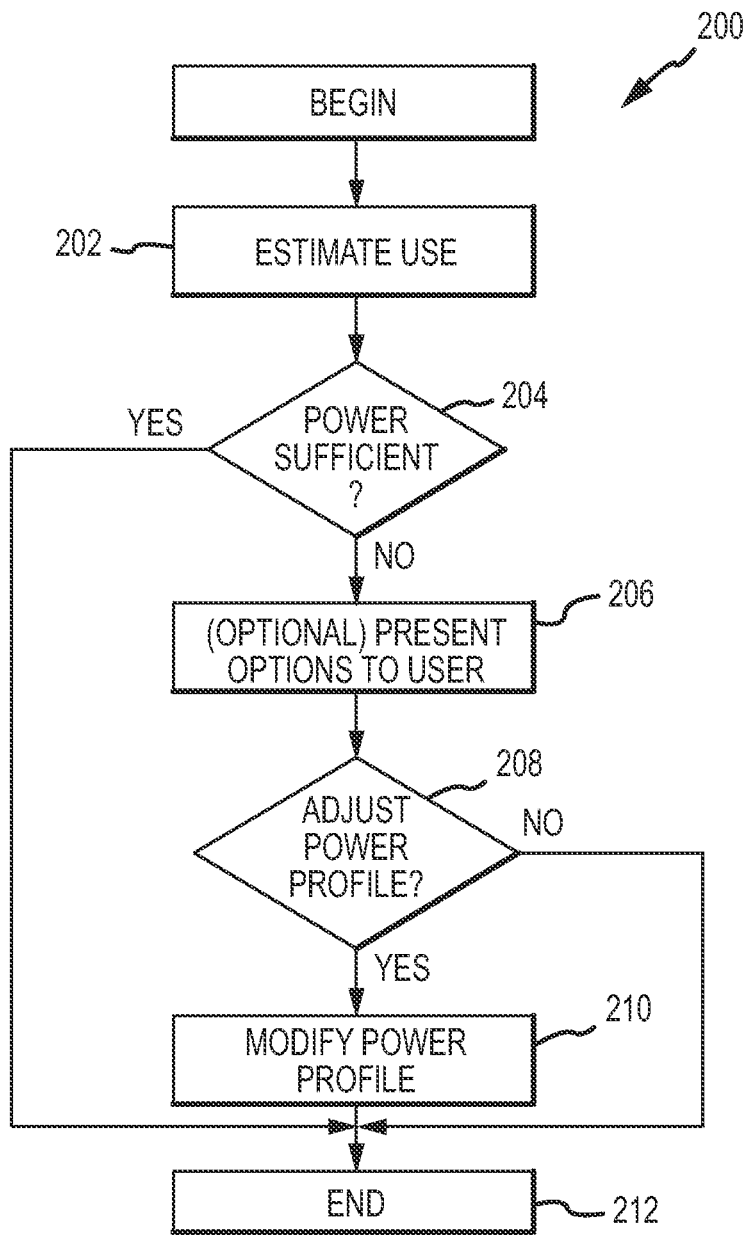
FIG. 5 is a flow chart illustrating a method for modifying a power management scheme for the mobile electronic device.

FIG. 5 is a flow chart illustrating a method 200 for adjusting a power management scheme for the mobile electronic device 100. The method 200 may begin with operation 202, in which the mobile electronic device 100 may determine the estimated use prior to the next anticipated charging time and/or location. For example, in operation 202 the mobile electronic device 100 may utilize the GPS mechanism 114 to determine its current location, and, based on the current location and stored location and time information, may estimate a time until the next charge.

The mobile electronic device 100 may also use data from, or related to, one or more applications or other software programs to determine the anticipated usage time and/or power consumption for an upcoming period of time. As a first example the mobile electronic device 100 may analyze a calendar application to determine the location and/or number of meetings and/or appointments that the user may be attending. This may allow the mobile electronic device 100 to estimate an anticipated schedule for charging and/or predicted usage.

As a second example, the mobile electronic device 100 may use a location application, such as a map, navigation, or direction application, to determine a distance and/or time from the one or more known locations and/or charging times. In this example, the user may have used an application to request directions from the first location 136 to a destination. In this case, the mobile electronic device may use an estimated travel time to and from the destination to estimate a use time for the mobile electronic device 100. The device 100 may couple this data with data from other applications, such as the aforementioned calendar application, to estimate the time a user will spend at the destination, thereby refining the use time calculations and accounting for activities at the destination or en route.

In addition to determining the time between charging locations, the mobile electronic device 100 may use one more sensors 108, applications, and/or the GPS mechanism 114 in order to determine the estimated power requirements during that time period. In this example, the sensors 108 may be used to predict the estimated power requirements. For example, the mobile device 100 may include a camera, which during "typical use" may rarely be activated. However, when a user is traveling or is on an atypical schedule, he or she may take multiple pictures, e.g., when a user is on vacation. In these instances, the activation of the camera may be evaluated to determine that the current use is abnormal and attempt to predict an estimated use. The estimated use may be predicted based on a sample of applications, sensors, or other programs used in the past few minutes and one or more assumptions regarding the next charging location and/or time.

As another example, the mobile electronic device 100 may predict that the user will want navigation or turn by turn directions for five hours while he or she is traveling to a location. This prediction may be based on map data, user interaction with the device or a specific application, application data, or the like. Continuing the example, the device 100 may access a calendar, determine the location of a meeting from an entry on the calendar, and compare that location to a list of known locations (such as charging locations). If the meeting location is unknown, the device may presume that the user will require turn-by-turn directions, and so that the device will be in near-constant or constant use during corresponding travel. In this example, the mobile electronic device 100 can predict using the travel time and the power consumption while running the application, the power consumption and use of the mobile electronic device 100 during the travel time.

Referring still to FIG. 4, after operation 202, the method 200 may proceed to operation 204. In operation 204, the processor 120 may determine whether the power remaining within the internal power source 118 is sufficient for the estimated use. The processor 120 may take into account any or all of the following: time until the mobile electronic device 100 may reach a known charging location; applications, sensors, or other programs predicted to be used during the time; data polling rates from one or more networks; and so on. For example, the more frequently the device 100 polls data may result in an increased power consumption or if the device 100 is polling data from a cellular network versus a WiFi network, the power consumption may similarly be increased. In this manner, the time alone to a next charging location may not be determinative of whether the power in the internal power source 118 may be sufficient. For example, a first user may typically use the mobile electronic device 100 to make short telephone calls, whereas a second user may use the mobile electronic device 100 for turn-by-turn navigation, email drafting, image capturing, and so on, and in this case the sufficiency of the power source 118 may be adequate for the first user but not the second.

Continuing with this example, in some embodiments, a user identity or user profile may also be used to determine whether the power remaining within the internal power source 118 is sufficient for the estimated use. The user identity may be determined if a user signs into the device (e.g., through a password or login), by which locations are accessed by the mobile electronic device 100, or in other manners (e.g., facial or speech recognition, direct user input, etc.). For example, if the mobile electronic device 100 is in Brad's car versus Jessica's car, the mobile electronic device 100 may determine that the user is Brad. As another example, if the location is Sara's office, the mobile electronic device 100 may determine that Sara is the current user and predict the estimated use of the device 100 based on Sara's typical usage patterns. In this manner, the mobile electronic device 100 may build a predictive network of different locations tied to a particular user. Then, as the mobile electronic device 100 moves between different locations or networks, the initial user identity estimate may be refined. Similarly, a travel pattern between one or more locations may also be used to refine the user identity estimate.

In operation 204, if the power is determined to be sufficient for the predicted use, the method 200 may proceed to end state 212. However, if the power in the internal power source 188 is not sufficiently charged for the predicted use, the method 200 may proceed to operation 206.

In operation 206 the mobile electronic device 100 may present operations to the user regarding the power management of the device 100. For example, the mobile electronic device 100 may indicate that based on the estimated use and the current charge of the internal power source 118 the device 100 may not have sufficient power to provide uninterrupted service to the next anticipated charging location. The mobile electronic device 100 may then present options to the user regarding adjusting one more characteristics of the device 100 in order to prolong the internal power supply.

As another example, the user may request directions to a location and, after or as part of providing the directions, the mobile electronic device 100 may indicate to the user that the power supply 118, with the mobile electronic device 100 in the current power management scheme, may not last until the destination. In some embodiments, the mobile electronic device 100 may display on a map an estimated point or location of power loss. For example, in displaying directions on a map from Cupertino, Calif. to San Francisco, Calif., the device 100 may display an icon in San Mateo, Calif. indicating that point as the estimated point of power loss.

The mobile electronic device 100 may present to the user options regarding the power management scheme in order to receive user input or the device may present information only, without receiving user input. For example, in some embodiments, the mobile electronic device 100 may adjust the power management scheme automatically without input from the user. Alternatively, the device may adjust the power management scheme with at least some input from the user.

Further in operation 206, the mobile electronic device 100 may display the options to the user regarding the power management scheme and/or display estimated power consumption on the display 104, or through the output member 105. For example, the output member 105 may be a speaker, which may provide an audible message to the user.

After operation 206, the method 200 may proceed to operation 208 and the mobile electronic device 100 may determine whether to adjust the current power management profile. The processor 120 may determine whether to adjust the current power management scheme based on a received input from the user or based on analysis of the power sufficiency the internal power supply 118. In one example, the user may provide input regarding whether to adjust the power management scheme, a user's estimation of device usage during a trip or other time period, whether or not he or she wishes to change the power management profile based on the projected/estimated power supply, or the like. In another example, the processor 120 may make an automatic determination based on one or both of the charge remaining in the internal power supply 118 and/or the estimated usage as to whether the current power management scheme needs to be changed.

In operation 208, if the embodiment determines that the power management scheme or profile is to be adjusted, operation 210 may be executed. In operation 210, the processor 120 may modify the power management scheme. By altering the power management scheme one or more settings, characteristics, applications, and/or components may be adjusted. For example, the processor 120 may adjust a data polling rate for a email application, a brightness of the display 104, turn off certain sensors (e.g., accelerometer, GPS mechanism 114, or the like), deactivate certain applications (e.g., game applications or applications that run any background processes), and so on.

The characteristics that may be adjusted by the power management scheme may vary based on the desired reduction in power usage for the mobile electronic device 100 and/or desired changes based on user input. For example, certain users may prefer to reduce or turn off data polling for email applications, whereas other users may prefer to deactivate GPS functions, telephone calls, text messages, image capture functions and the like. Certain embodiments may permit users to specify any or all functionality, separately or in groups, to deactivate in order to prolong a device charge.

Further, some embodiments may permit a user to define different tiers or levels of functionality to deactivate. That is, when the device's charge reaches a first threshold, a first set of user-specified functions may be terminated. As a second threshold, a second set of user-specified functions may be deactivated, and so on. The second set of functions may overlap, complement or replace the first set of functions. That is, when the second set of functions is deactivated, some embodiments may permit a function previously deactivated to be reactivated. Further, some embodiments may provide a user interface that not only permits the specification of tiers in this fashion, but also shows the relative decrease in power requirements as functions, applications, characteristics and the like are activated or deactivated. In this manner, the device may inform a user of the particular power savings for each tier or set the user creates, thereby facilitating the creation of multiple tiers of deactivated functions, each of which conserves more power than the prior tier. Indeed, certain embodiments may require successive tiers to each preserve more power than the prior tier.

It should also be appreciated that some embodiments may automatically define such tiers without user input, based on a variety of factors. These factors may include general power requirements for certain applications, functionality and the like, user usage patterns (such that less-commonly used functions are shut down prior to more-commonly used functions), device or manufacturer-specified importance of various functions and the like.

In some embodiments, the profile power management schemes may be dynamically created based on the desired reduction of power usage or time estimated until a next anticipated recharge. In these embodiments, the processor 120 may determine the characteristics or settings to modify in order to reduce power consumption on an instant by instant or occurrence basis. In other embodiments, the power management schemes may be stored within the memory 122 and may be implemented based on certain thresholds of power saving required. For example, there may be a low power scheme, a medium power scheme, and/or a high power scheme that may include static adjustments to certain characteristics or settings that may be implemented when a particular power management scheme is implemented. It should be noted that in either a dynamically adjusted or a static profile management scheme, the changes to the one or more components, characteristics, or settings may be based on user input. For example, when the user activates or otherwise interacts with the mobile electronic device 100, he or she may enter in certain data in order for the mobile electronic device 100 to create the one or more static power management schemes.

Following operation 210, the method terminates in end state 212.

Returning to operation 208, if it is determined the power management scheme is not to be adjusted, the method 200 may terminate at end state 212. However, it should be noted that, in some embodiments, the mobile electronic device 100 may frequently and/or continuously monitor the estimated use, time between charging locations 136, 138, 140 and may adjust or repeat the method 200 as needed or desired. That is, the end state 212 may be replaced with a loop back to operation 202 or 204.

Figure 6:
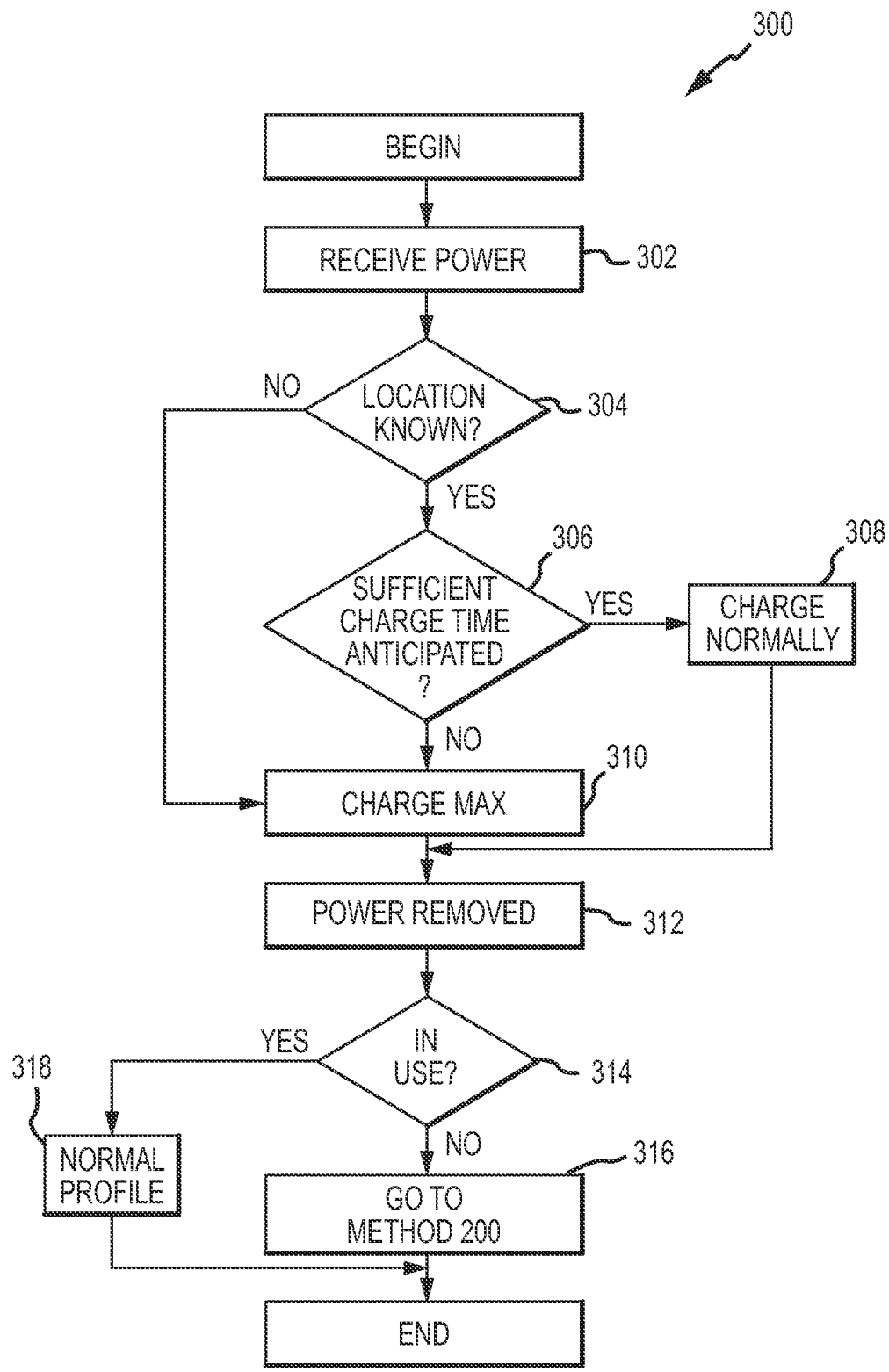
FIG. 6 is a flow chart illustrating a method for modifying a power charging scheme for the mobile electronic device.

In some embodiments, one or more of the power management profiles may vary a charging power scheme for the mobile electronic device 100. FIG. 6 is a flow chart illustrating a method 300 for varying a power management scheme based on a charging location or external power source 142, 144, 146 in communication with the mobile electronic device 100. The method 300 may begin with operation 302 and the mobile electronic device 100 may receive power. For example, the charge cable 102 may be communicatively coupled to the input port 112 and to one of the external power sources 142, 144, 146. In this example, the internal power source 118 may receive power (e.g., electrons) through the charge cable 102.

As the mobile electronic device 100 receives power, the method 300 may proceed to operation 304. In operation 304 the processor 120 may determine whether the location of the external power source is known. For example, as described above with respect to FIG. 4, the mobile electronic device 100 may store in the memory 122 one or more locations 136, 138, 140 that may be correlated to one or more external power sources 142, 144, 146. The mobile electronic device 100 may use the GPS mechanism 114, one or more of the sensors 108, and/or the network/communication interface 116 to determine a current charging location. Once the charging location is mapped, the processor 120 may determine if this particular location has been previously stored or saved in the memory 122.

In operation 304 the mobile electronic device 100 may also determine a type of external power source for the charging location. For example, the mobile electronic device 100 may analyze a power charging rate, communications with an external device (which may include particular device identifications provided to the device 100), the plug or pin-out used to provide power, and the like to determine the nature of the external power source. The embodiment may determine if the power source is mobile, stationary, permanent, and/or temporary, as well as the type of power source (e.g., a wall outlet, USB port, mobile charging device and the like). This may be possible because some external power sources 142, 144, 146 may have lower power transfer rates than others. For example, when the charge cable 102 is connected to a car outlet, the power transfer rate may be less than if the charge cable is connected to a wall outlet. Additionally, as the power cable 102 may also transfer data to the mobile electronic device 100 from the external power source 142, 144, 146 the data may include information regarding the source.

If the embodiment determines in operation 304 that the mobile electronic device 100 is receiving power in a known charging location, the method may proceed to operation 306. Otherwise, operation 310 is executed as detailed below.

In operation 306 the processor 120 may determine or estimate whether there is sufficient time to procure a full device charge. The charge time may be estimated or anticipated based on a typical charging time associated with, or that is common for, the known charging location. For example, as described in more detail with respect to the method 150 illustrated in FIG. 4, a charge time for a particular charging location 136, 138, 140 may be stored. As the device is repeatedly charging in a given charging location, a "typical behavior" for the particular location may be calculated and stored. The typical charging time may be as average or median of all charging operations that have occurred in a particular location. For example, a user may plug his or her mobile device 100 into a given external power source 142, 144, 146 more than once a day, and each charging operation may continue for a different length of time. The average of all these times may be determined and stored, or a median charge time may be used.

Given the foregoing, in operation 306 the processor 120 may determine whether, in light of the current charge of the internal power source 118, the estimated charging time associated with the present location is adequate to fully charge the internal power source 118. For example, the internal power source 118 may only have a 20% charge remaining, and the typical charging time may be 20 minutes. This may not be sufficient to completely charge the internal power source 118. In another example, the internal power source 118 may have a 90% charge remaining and the typical charging time may be 90 minutes, which may be more than adequate to charge the mobile electronic device 100.

If the embodiment estimates in operation 306 that the charging time is adequate, the method 300 may proceed to operation 308. In operation 308 the mobile electronic device 100 may charge normally or may charge based on the currently implemented power management scheme. For example, power may be transferred to the mobile electronic device 100 at a predetermined rate based on the particular type o external power source 142, 144, 146. As another example, the mobile electronic device 100 may continue to receive power charge in a "trickle" manner so as to not overcharge the internal power source 118.

Returning briefly to operation 306, if the charging time is inadequate (as determined by the processor 120), the method 300 may proceed to operation 310. Additionally, operation 310 may be accessed from operation 304 if the current charging location is not known. In operation 310 the mobile electronic device 100 may implement a power management scheme to charge at a the fastest possible rate. The maximum possible power transfer rate may be implemented by increasing a transfer rate between the external power source 142, 144, 146 and/or charge cable 102, decreasing the power consumption of the mobile electronic device 100 during charging (e.g., modifying settings, turning off applications, or the like), or may require powering down the mobile electronic device 100.

After operation 308 or operation 310, the method 300 may proceed to operation 312 and the external power source 142, 144, 146 may be removed. For example, the charge cable 102 may be removed from either the mobile electronic device 100 and/or the external power source 142, 144, 146, or the external power source 142, 144, 146 may lose power (e.g., if the external power source 142, 144, 146 is a vehicle outlet and the vehicle is shutoff).

After operation 312, the method 300 may proceed to operation 314 and the processor 120 may determine whether the mobile electronic device 100 is in use. For example, the processor 120 may determine if there are one or more applications running, whether the user is providing any input to the mobile electronic device 100, whether the sensors 108 are receiving input, and so on.

In operation 314, if the processor 120 determines that the mobile electronic device 100 is in use, the method 300 may proceed to operation 318 and the current power management scheme may remain activated. This may allow the user to be able to use the mobile electronic device 100 to its fullest extent, while the user is actually using the mobile electronic device 100.

In operation 314, if the processor 120 determines that the mobile electronic device 100 is not in use, the method 300 may proceed to the method 200 illustrated in FIG. 5. This may allow the mobile electronic device 100 to vary the power management scheme based on the location and predicted use. After operation 316 and/or operation 318 the method 300 may end. However, in some embodiments, after operation 318 and after the user has stopped using the mobile electronic device 100, the method 300 may return to method 200. In this manner, the mobile electronic device 100 may continue to dynamically adjust one or more settings based on the predicted power consumption and/or time between charging locations.

CONCLUSION

The foregoing description has broad application. For example, while examples disclosed herein may focus on a power management scheme, it should be appreciated that the concepts disclosed herein may equally apply to schemes or profiles for other aspects of the mobile electronic device. Similarly, although the electronic device may be discussed with respect a mobile electronic device, the devices and techniques disclosed herein are equally applicable to other types of devices. Accordingly, the discussion of any embodiment is meant only to be exemplary and is not intended to suggest that the scope of the disclosure, including the claims, is limited to these examples.

What is claimed is:

1. A method for modifying one or more characteristics of a mobile electronic device comprising:
  determining, by a processor of the mobile electronic device, whether the mobile electronic device is in use after a connection providing power to an internal power source of the mobile electronic device from a first external power source at a first charging location is removed; and
  in response to a determination that the mobile electronic device is not in use:
    estimating, by the processor, an upcoming time period before the mobile electronic device is communicatively coupled to a second external power source by analyzing a current location of the mobile electronic device in comparison to a known second charging location of the second external power source,
    determining, by the processor, an estimated use of the mobile electronic device during the upcoming time period,
    determining, by the processor, whether an internal power source of the mobile electronic device has sufficient power to continue operation of the mobile electronic device in a first state during the upcoming time period, and
    in response to a determination that the internal power source does not have sufficient power: adjusting a power management scheme to reduce a power consumption of the mobile electronic device during the upcoming time period.

2. The method of claim 1, wherein the estimated use of the mobile electronic device is determined by analyzing at least one of the following: a typical use pattern of the mobile electronic device and a projected use of the mobile electronic device during the upcoming time period.

3. The method of claim 1, wherein the power management scheme controls one or more characteristics of one or more components of the mobile electronic device, and the one or more characteristics are at least one of an application setting, a data fetch rate, a sampling rate, or an application activation.

4. The method of claim 1, wherein the external power source comprises one of the following: a wall outlet, a mobile charging outlet, an input on a computer, and an inductive or wireless power source.

5. The method of claim 1, wherein the known charging location is one of the following: stationary, temporary, or mobile.

6. The method of claim 1, further comprising:
determining, by the processor, a usage pattern associated with the mobile electronic device, wherein the usage pattern specifies one or more components of the mobile electronic device that are commonly used by a user of the mobile electronic device, and
wherein said adjusting the power management scheme further comprises deactivating at least another component of the mobile electronic device based on the usage pattern of the user such the at least another component that is not commonly used by the user is deactivated prior to the one or more components that are commonly used by the user.

7. A mobile electronic device comprising:
an internal power source configured to supply power to one or more components of the mobile electronic device;
a processor in communication with the internal power source and configured to:
determine whether the mobile electronic device is in use after a connection providing power to the internal power source from a first external power source at a first charging location is removed;
in response to a determination that the mobile electronic device is not in use:
estimate a time period before the mobile electronic device is communicatively coupled to a second external power source at a second charging location;
determine an estimated use of the mobile electronic device during the time period;
analyze a charge of the internal power supply to determine whether the internal power source has sufficient power to provide power through the time period; and
adjust a power management scheme in response to a determination that the internal power supply does not have sufficient power; and
a location mechanism in communication with the processor, the location mechanism configured to determine a location of the mobile electronic device.

8. The mobile electronic device of claim 7, wherein the processor is further configured to use the location determined by the location mechanism to determine the estimated use of the mobile electronic device during the time period.

9. The mobile electronic device of claim 7, wherein the power management scheme controls one or more characteristics of the one or more components of the mobile electronic device.

10. The mobile electronic device of claim 7, further comprising a memory component configured to store a first location and a second location of the mobile electronic device.

11. The mobile electronic device of claim 10, wherein the first location is associated with the first charging location of the first external power source and the second location is associated with the second charging location of the second external power source.

12. The mobile electronic device of claim 11, wherein the memory component stores data corresponding to the first location when the internal power source is in communication with the first external power source.

13. The mobile electronic device of claim 12, wherein the memory component stores data corresponding to the second location when the internal power source is in communication with the second external power source.

14. A method for implementing a power management scheme of an electronic device comprising:
charging an internal power source of the electronic device from an external power source;
determining, by a processor of the electronic device, whether a charging location associated with the external power source is known, wherein the charging location provides charging time information associated with the external power source;
in response to a determination that the charging location associated with the external power source is not known, modifying a power transfer rate between the internal power source and the external power source; and
in response to a determination that the charging location associated with the external power source is known, determining whether an anticipated charge time is sufficient to recharge the internal power source to a predetermined level.

15. The method of claim 14, wherein the anticipated charge time is determined by analyzing a typical charge time data stored in a memory component for the charging location of the external power source.

16. The method of claim 15, wherein in response to a determination that the anticipated charge time is not sufficient to recharge the internal power source, increasing the power transfer rate between the internal power source and the external power source.

17. The method of claim 14, wherein the internal power source and the external power source are in communication with a charge cord, wherein the charge cord transmits power from the external power source to the internal power source.

18. The method of claim 14, further comprising:
removing a connection between the internal power source and the external power source; and
determining, by the processor, whether the electronic device is in use.

19. The method of claim 18, wherein in response to a determination that the electronic device is not in use, the method further comprises:
determining, by the processor, an estimated use of the electronic device during a time period;
determining, by the processor, whether the internal power source has sufficient power to continue operation of the electronic device during the time period; and
in response to a determination that the internal power source does not have sufficient power, adjusting one or more characteristics to reduce a power consumption of the electronic device during the time period.

20. The method of claim 14, wherein the external power source comprises one of the following: a wall outlet, a mobile charging outlet, an input on a computer, and an inductive or wireless power source.

* * * * *